US009693312B2

(12) United States Patent
Roessel et al.

(10) Patent No.: US 9,693,312 B2
(45) Date of Patent: Jun. 27, 2017

(54) COMMUNICATION TERMINAL AND METHOD FOR CONTROLLING POWER CONSUMPTION OF A COMMUNICATION TERMINAL

(71) Applicant: Intel Corporation, Santa Clara, CA (US)

(72) Inventors: Sabine Roessel, Munich (DE); Ralph Hasholzner, Munich (DE); Sangeetha Bangolae, Beaverton, OR (US); Youn Hyoung Heo, San Jose, CA (US); Volker Aue, Dresden (DE)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 14/530,893

(22) Filed: Nov. 3, 2014

(65) Prior Publication Data
US 2016/0127998 A1    May 5, 2016

(51) Int. Cl.
*H04W 52/02*     (2009.01)
*H04W 72/04*     (2009.01)
*H04L 5/00*      (2006.01)

(52) U.S. Cl.
CPC ......... *H04W 52/0261* (2013.01); *H04L 5/001* (2013.01); *H04L 5/0096* (2013.01); *H04W 52/0277* (2013.01); *H04W 72/048* (2013.01); *H04L 5/0066* (2013.01); *Y02B 60/50* (2013.01)

(58) Field of Classification Search
CPC . H04W 52/0261; H04W 72/048; H04W 4/20; H04W 52/0277; H04L 5/001; H04L 5/0096; H04L 5/0066; Y02B 60/50

USPC .......................................................... 370/311
See application file for complete search history.

(56) References Cited

U.S. PATENT DOCUMENTS

| 8,526,907 B2 * | 9/2013 | Sivonen | H04B 1/109 330/61 A |
| 9,479,315 B2 * | 10/2016 | Khay-Ibbat | H04L 5/0057 |
| 2008/0311961 A1 * | 12/2008 | Cotevino | H04W 4/16 455/574 |

(Continued)

FOREIGN PATENT DOCUMENTS

| EP | 2265068 A1 | 12/2010 |
| WO | 2010145938 A1 | 12/2010 |

OTHER PUBLICATIONS

3GPP TSG RAN Meeting #55 "LTE RAN Enhancements for Diverse Data Applications", Xiamen, P.R. China Feb. 28-Mar. 2, 2012, RP-120256, revision of RP-111372, 6 pages.

(Continued)

*Primary Examiner* — Luat Phung
*Assistant Examiner* — Thomas R Cairns
(74) *Attorney, Agent, or Firm* — Viering, Jentschura & Partner mbB (57) ABSTRACT

A communication terminal is described comprising a transceiver configured to communicate using carrier aggregation according to a first carrier aggregation setting, a detector configured to detect a need for the communication terminal to reduce its power consumption and a controller configured to initiate a switch from the first carrier aggregation setting to a second carrier aggregation setting with reduced power consumption compared to the first carrier aggregation setting if the detector has detected a need for the communication terminal to reduce its power consumption.

22 Claims, 7 Drawing Sheets

(56) References Cited

U.S. PATENT DOCUMENTS

| | | | | |
|---|---|---|---|---|
| 2010/0020734 | A1* | 1/2010 | Nakagawa | H04W 72/048 370/311 |
| 2010/0194632 | A1* | 8/2010 | Raento | H04M 1/72572 342/357.25 |
| 2012/0167118 | A1* | 6/2012 | Pingili | G06F 1/3206 719/318 |
| 2012/0254448 | A1* | 10/2012 | Wheeler | H04W 4/001 709/227 |
| 2013/0005333 | A1* | 1/2013 | Chueh | H04W 36/24 455/426.1 |
| 2013/0053044 | A1* | 2/2013 | Davies | H04W 8/18 455/438 |
| 2013/0136015 | A1* | 5/2013 | Ojala | H04L 5/001 370/252 |
| 2013/0159478 | A1* | 6/2013 | Rousu | H04W 52/0229 709/221 |
| 2013/0163497 | A1 | 6/2013 | Wei | |
| 2013/0229964 | A1* | 9/2013 | Chakravarthy | H04W 52/0212 370/311 |
| 2014/0098693 | A1* | 4/2014 | Tabet | H04W 36/0083 370/252 |
| 2014/0195843 | A1* | 7/2014 | Lai | H04W 52/0209 713/324 |
| 2015/0341884 | A1* | 11/2015 | Das | H04W 56/0035 370/311 |
| 2016/0057645 | A1* | 2/2016 | Takano | H04W 24/10 370/252 |

OTHER PUBLICATIONS

3GPP TSG RAN Meeting #53 "LTE RAN Enhancements for Diverse Data Applications", Fukuoka, Japan Sep. 2011, RP-120256, revision of RP-111372, 7 pages.

3GPP TR 36.822, 3rd Generation Partnership Project; Technical Specification Group Radio Access Network; LTE Radio Access Network (RAN) enhancements for diverse data applications (Release 11), V11.0.0, Sep. 2012, 49 pages.

Extended European Search report received for the corresponding EP patent application No. 15188257.8 dated Mar. 23, 2016, 8 pages.

Office Action received for Taiwanese Application No. 104131855 dated Jul. 29, 2016, 9pages and including its English Translation 8 pages.

* cited by examiner

COMMUNICATION TERMINAL AND METHOD FOR CONTROLLING POWER CONSUMPTION OF A COMMUNICATION TERMINAL

TECHNICAL FIELD

Embodiments described herein generally relate to a communication terminal and method for controlling power consumption of a communication terminal.

BACKGROUND

In a modern communication terminal such as a smart phone the power consumption is typically an issue since the user typically wants the terminal's battery to last as long as possible and to charge the terminal's battery as infrequently as possible. However, modern communication techniques such as carrier aggregation, while offering enhanced communication performance, increase the power consumption of communication devices. Therefore, approaches for handling the power consumption in mobile communication terminals using such technologies are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
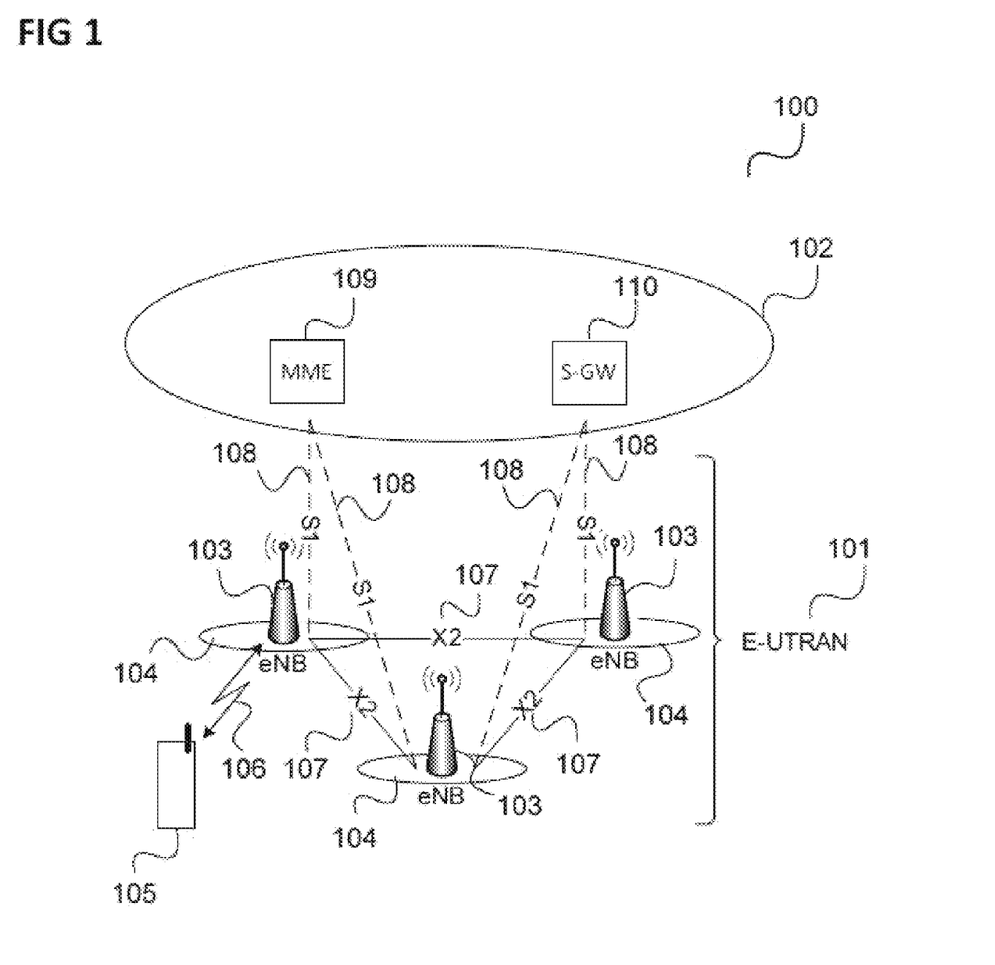
FIG. 1 shows a communication system.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications) etc.

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Using its connection to the E-UTRAN 101 and the core network 102, the mobile terminal 105 can communicate with other devices located in other networks, e.g. a server in the Internet, for example for downloading data using a TCP (Transport Control Protocol) connection according to FTP (File Transport Protocol).

LTE-Advanced further evolves LTE in terms of spectral efficiency, cell edge throughput, coverage and latency based on the agreed requirements. One of the key characteristics of LTE-Advanced is the support of bandwidths >20 MHz and up to 100 MHz by spectrum or carrier aggregation, i.e. the bandwidth of an LTE-Advanced (LTE-A) radio cell is composed of a number of so-called component carriers (CC), in where the bandwidth size of each component carrier is limited to a maximum of 20 MHz. Each component carrier is provided by a different cell (serving cell) wherein a primary serving cell handles the RRC (radio resource control) connection and provides the primary component carrier. The one or more other serving cells offering component carriers are referred to as secondary cells.

The component carriers may be adjacent or non-adjacent. An LTE-A UE may simultaneously receive or transmit on one or multiple component carriers depending on its RF capabilities. The carriers (i.e. the component carriers) can lie within different frequency bands (inter-band) or within the same frequency band next to each other (intra-band contiguous) or in the same frequency band but with a frequency gap between them (intra-band non-contiguous). An LTE-A UE typically needs a certain time to switch a receive chain to another component carrier. During this switching time, no reception is possible. The switching time is typically UE implementation dependent.

UE power consumption can be expected to significantly increase with the availability and potential use of LTE carrier aggregation. While the 3GPP standard differentiates configuration as well as activation of the secondary cell in LTE carrier aggregation, UE power consumption depends on how the network operates and/or parameterizes carrier aggregation.

Figure 2:
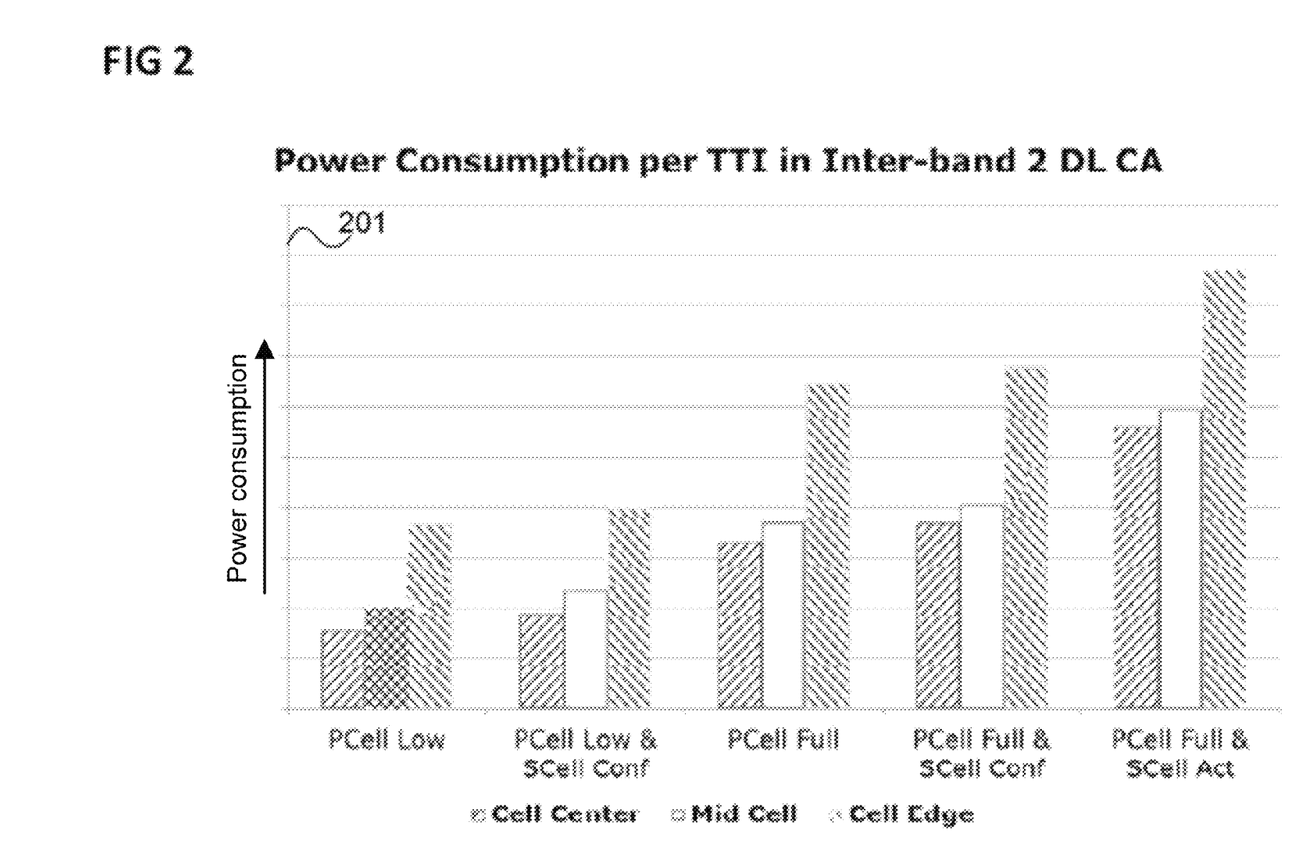
FIG. 2 illustrates downlink carrier aggregation power consumption relative to low load primary cell power consumption.
Figure 3:
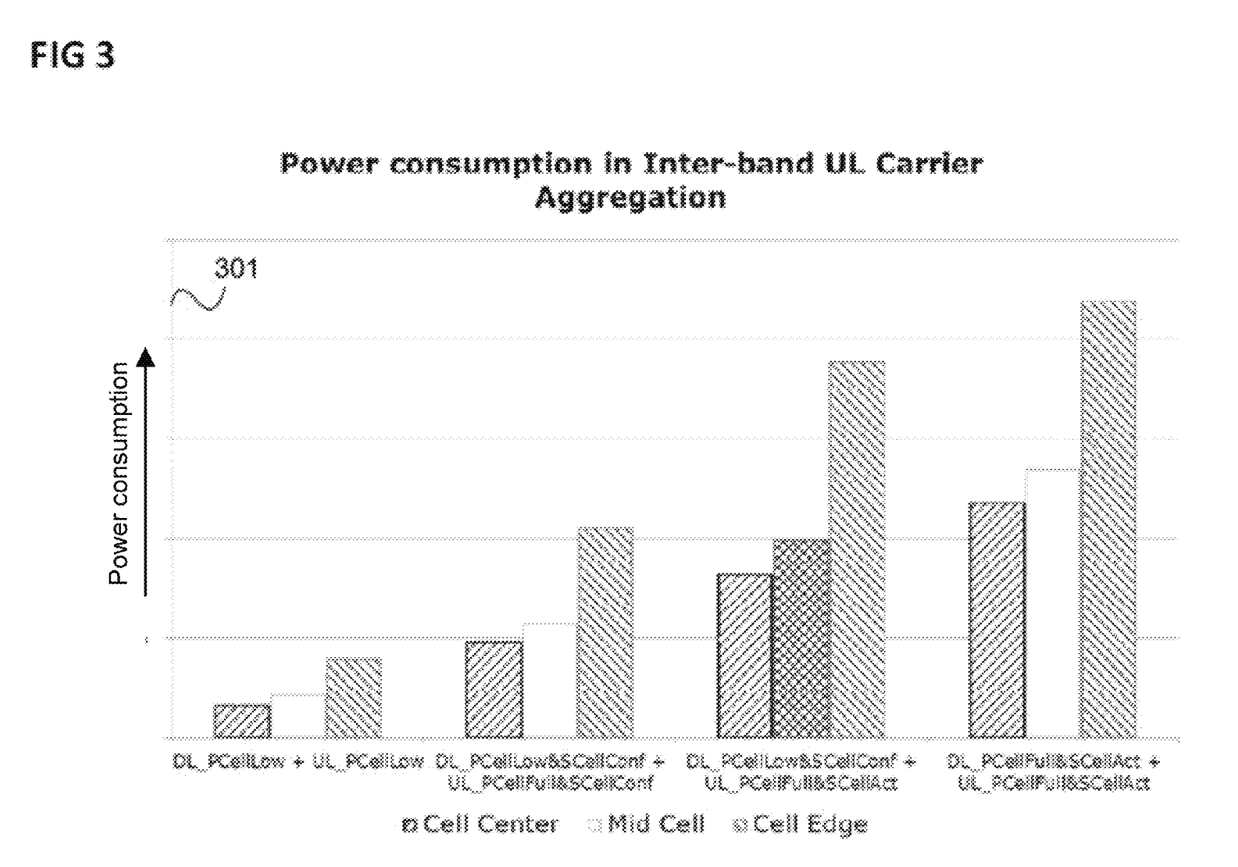
FIG. 3 sketches uplink carrier aggregation power consumption relative to a typical uplink carrier aggregation case.

The additional power consumption due to carrier aggregation is illustrated in FIGS. 2 and 3.

FIG. 2 illustrates 2 Down Link carrier aggregation power consumption relative to low load primary cell power consumption (cross hatched column) in an average radio link quality (Mid Cell).

Power consumption increases from bottom to top along a y axis 201. The power consumption is shown for the scenarios PCell Low: UE communicates at a rather low data rate using only one component carrier provided by the primary cell.
PCell Low & SCell Conf: UE communicates at a rather low data rate using only one component carrier provided by the primary cell, and a component carrier offered by a secondary cell is configured (i.e. is ready to be active).
PCell Full: UE communicates at a rather high data rate using only one component carrier offered by the primary cell.
PCell Full & SCell Conf: UE communicates at a rather high data rate using only one carrier offered by the primary cell, and a component carrier provided by a secondary cell is configured (i.e. is ready to be active).
PCell Full & SCell active: UE communicates at a rather high data rate using a component carrier provided by the primary cell as well as a component carrier provided by the secondary cell.

A sketch of the power consumption trends (it should be noted that real ratios and absolute power consumption values depend on the implementation) is shown for each scenario each time for the case that the UE is at the cell center, on the cell edge, or mid cell (i.e. in an intermediate area between cell center and cell edge).

FIG. 3 sketches Up Link carrier aggregation power consumption trends compared to a typical UL CA (uplink carrier aggregation) case (cross hatched column) where DL CA (downlink carrier aggregation) is configured and UL CA is activated and exploited due to heavy UL traffic.

Power consumption increases from bottom to top along the y axis 301. The power consumption trends are sketched for various scenarios wherein each scenario uses an UL scenario (prefix 'UL_') and a DL scenario (prefix 'DL_') which are described using the designations as given above for the scenarios of FIG. 2.

As can be seen, exploiting carrier aggregation may imply quite an increase in UE power consumption, in particular compared to low data rate single carrier operation. It may occur that such an increase in power consumption is higher than what can be handled by the UE or what is desired by its user (e.g. in view of a low battery charge). In the following, an approach is described which allows addressing this issue.

Additionally, devices with activated Secondary Component Carriers may experience high data rates and hence very high processing load, and—if this continues over a relevant period of time—such devices may suffer from overheating. Hence, UE-triggered down-grading of the Carrier Aggregation configuration/activation status will be desirable.

Figure 4A:
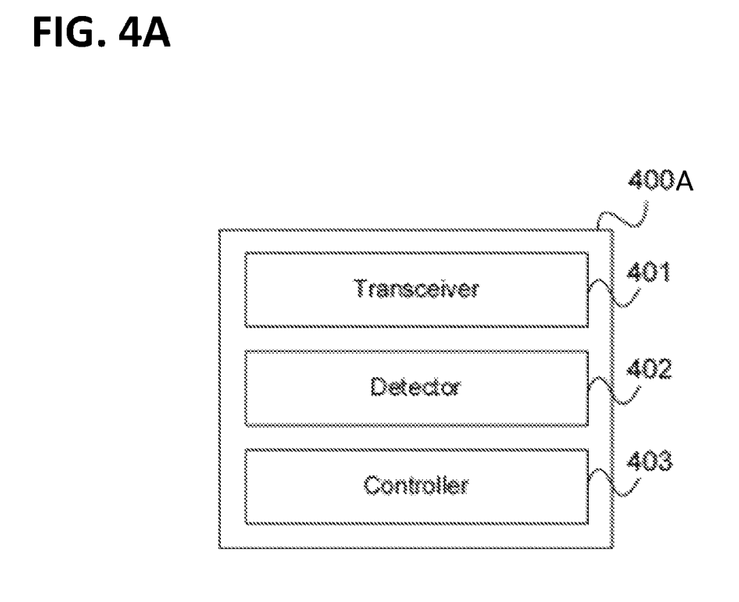
FIG. 4A shows a communication terminal.

FIG. 4A shows a communication terminal 400A.

The communication terminal 400A includes a transceiver 401 configured to communicate using carrier aggregation according to a first carrier aggregation setting.

Further, the communication terminal 400A includes a detector 402 configured to detect a need for the communication terminal to reduce its power consumption.

The communication terminal 400A further includes a controller 403 configured to initiate a switch from the first carrier aggregation setting to a second carrier aggregation setting with reduced power consumption compared to the first carrier aggregation setting if the detector has detected a need for the communication terminal to reduce its power consumption.

According to one embodiment, in other words, when a communication terminal (e.g. a mobile terminal such as a UE according to LTE) has a need for reduction of its power consumption (e.g. due to its battery charge being low) it targets at changing the use of carrier aggregation, e.g. it steers the network (i.e. the respective radio access network, e.g. E-UTRAN 101) towards or it signals to the network a request for a deactivation or even a deconfiguration of one or more DL and/or UL secondary cells.

Figure 4B:
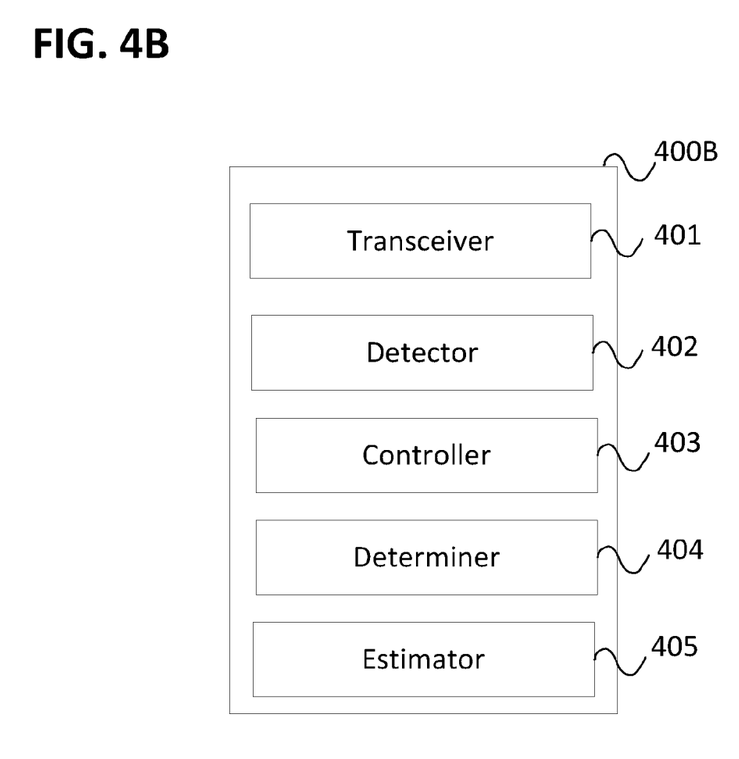
FIG. 4B shows a communication terminal.

FIG. 4B shows a communication terminal 400B.

The communication terminal 400B may be the same or similar as 400A and may further include a determiner 404 configured to determine the threshold based on a current power consumption of the communication terminal.

The communication terminal 400B may further include an estimator 405 configured to estimate an amount by which the power consumption of the communication terminal being reduced when switching from the first carrier aggregation setting to the second aggregation setting.

Thus, by such an interaction between the mobile terminal and the network, the mobile terminal may reduce its power consumption (i.e. save power). This may go beyond what the terminal is able to achieve in a terminal-only implementation (i.e. without triggering the network power saving measures or signaling to the network the request for power saving measures).

A need for the communication terminal to reduce its power consumption may be understood to mean that the requirement of the communication terminal to reduce its power consumption is of sufficient importance such that it outweighs the reduced performance of the second carrier aggregation setting compared to the first carrier aggregation setting. A need for the communication terminal to reduce its power consumption may thus for example be understood as that power consumption of the communication terminal has to be reduced to avoid that the operation (in particular communication) of the communication terminal has to stop, i.e. to ensure that the operation of the communication terminal can continue for e.g. a predetermined minimum time.

A carrier aggregation setting can for example be understood as one or more certain secondary cells being configured or active or being configured or active for a certain amount of time (e.g. a certain percentage of the TTIs (time transmission intervals) of the frame structure according to which the communication terminal communicates). Accordingly, the second carrier aggregation setting may for example include less or no secondary cells being configured or being active or secondary cells being configured or being active less frequently than according to the first carrier aggregation setting.

Figure 5:
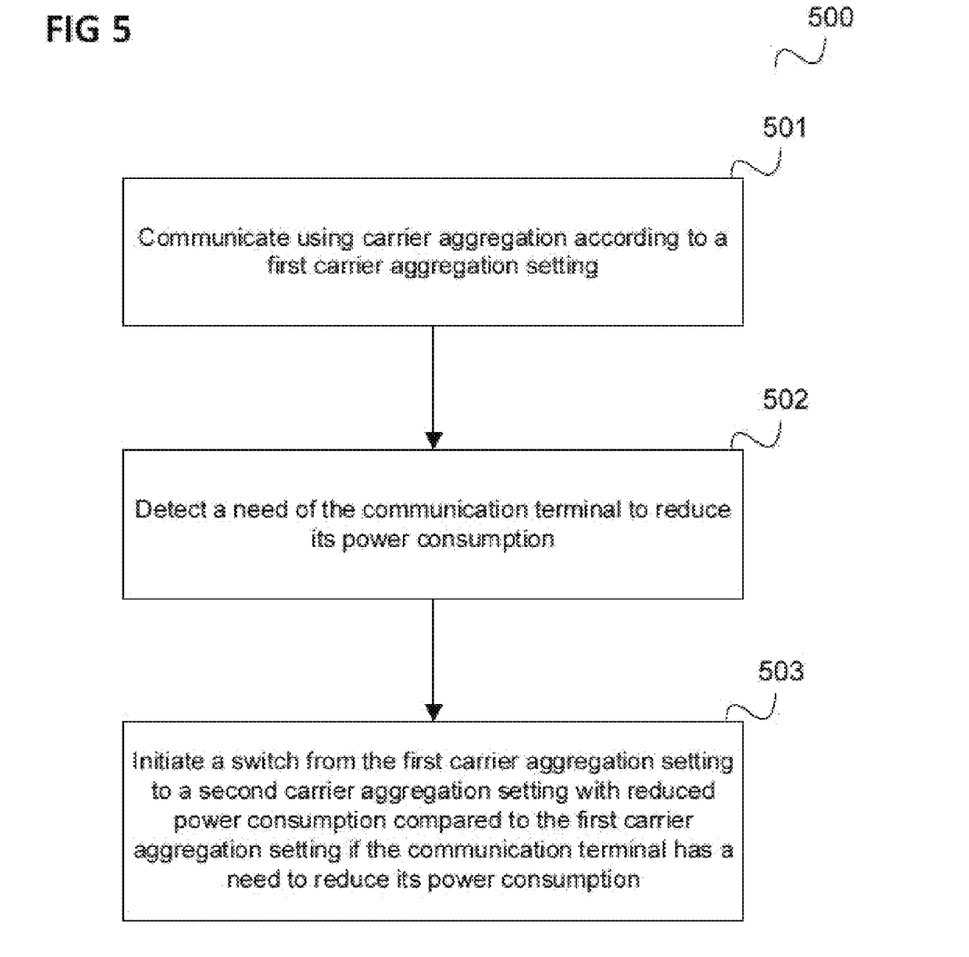
FIG. 5 shows a flow diagram illustrating a method for controlling power consumption of a communication terminal.

The communication terminal 400 for example carries out a method as illustrated in FIG. 5.

FIG. 5 shows a flow diagram 500 illustrating a method for controlling power consumption of a communication terminal, for example carried out by a communication terminal.

In 501, the communication terminal communicates using carrier aggregation according to a first carrier aggregation setting.

In 502, the communication terminal detects a need for the communication terminal to reduce its power consumption.

In 503, the communication terminal initiates a switch from the first carrier aggregation setting to a second carrier aggregation setting with reduced power consumption compared to the first carrier aggregation setting if the communication terminal has a need to reduce its power consumption.

The following examples pertain to further embodiments.

Example 1 being a communication terminal as illustrated in FIG. 4.

In Example 2, the subject matter of Examples 1 may optionally include the detector being configured to detect a need for the communication terminal to reduce its power consumption based on a current power consumption of the communication terminal.

In Example 3, the subject matter of any one of Examples 1-2 may optionally include the detector being configured to detect a need for the communication terminal to reduce its power consumption based on a charging level of a battery of the communication terminal.

In Example 4, the subject matter of Example 3 may optionally include the detector being configured to detect a need for the communication terminal to reduce its power consumption based on whether the charging level being below a threshold.

In Example 5, the subject matter of Example 4 may optionally include a determiner configured to determine the threshold based on a current power consumption of the communication terminal.

In Example 6, the subject matter of any one of Examples 1-5 may optionally include an estimator configured to estimate an amount by which the power consumption of the communication terminal being reduced when switching from the first carrier aggregation setting to the second aggregation setting.

In Example 7, the subject matter of Example 6 may optionally include the estimator being configured to estimate the amount based on one or both of a duration for which one or more secondary cells are configured and a duration for which one or more secondary cells are active according to the first carrier aggregation setting.

In Example 8, the subject matter of any one of Examples 6-7 may optionally include the controller being configured to initiate the switch if the detector has detected a need for the communication terminal to reduce its power consumption and if the estimated amount is above a predetermined threshold.

In Example 9, the subject matter of any one of Examples 1-8 may optionally include the controller being configured to initiate the switch by sending an indicator to a network component.

In Example 10, the subject matter of Example 9 may optionally include the indicator being a Power Preference Indicator-trigger signaling a desire for a switch from the first carrier aggregation setting to the second carrier aggregation setting based on bilateral or multilateral agreements.

In Example 11, the subject matter of any one of Examples 1-10 may optionally include the controller being configured to initiate the switch by indicating a lower communication performance with a secondary cell than the communication terminal experiences with the secondary cell.

In Example 12, the subject matter of any one of Examples 1-11 may optionally include the first carrier aggregation setting comprising a secondary cell being configured for the communication terminal for a time interval and the secondary carrier aggregation setting comprising the secondary cell not being configured for the communication terminal for the time interval.

In Example 13, the subject matter of any one of Examples 1-12 may optionally include the first carrier aggregation setting comprising a secondary cell being active for the communication terminal for a time interval and the secondary carrier aggregation setting comprising the secondary cell not being active for the communication terminal for the time interval.

Example 14 being a method for controlling power consumption of a communication terminal as illustrated in FIG. 5.

In Example 15, the subject matter of Example 14 may optionally include detecting the need of the communication terminal to reduce its power consumption based on a current power consumption of the communication terminal.

In Example 16, the subject matter of any one of Examples 14-15 may optionally include detecting the need of the communication terminal to reduce its power consumption based on a charging level of a battery of the communication terminal.

In Example 17, the subject matter of Example 16 may optionally include detecting the need of the communication terminal to reduce its power consumption based on whether the charging level being below a threshold.

In Example 18, the subject matter of Example 17 may optionally include determining the threshold based on a current power consumption of the communication terminal.

In Example 19, the subject matter of any one of Examples 14-18 may optionally include estimating an amount by which the power consumption of the communication terminal being reduced when switching from the first carrier aggregation setting to the second aggregation setting.

In Example 20, the subject matter of Example 19 may optionally include estimating the amount based on one or both of a duration for which one or more secondary cells are configured and a duration for which one or more secondary cells are active according to the first carrier aggregation setting.

In Example 21, the subject matter of any one of Examples 19-20 may optionally include initiating the switch if a need for the communication terminal to reduce its power consumption has been detected and if the estimated amount is above a predetermined threshold.

In Example 22, the subject matter of any one of Examples 14-21 may optionally include initiating the switch by sending an indicator to a network component.

In Example 23, the subject matter of Example 22 may optionally include the indicator being a Power Preference Indicator-trigger signaling a desire for a switch from the first carrier aggregation setting to the second carrier aggregation setting based on bilateral or multilateral agreements.

In Example 24, the subject matter of any one of Examples 14-23 may optionally include initiating the switch by indicating a lower communication performance with a secondary cell than the communication terminal experiences with the secondary cell.

In Example 25, the subject matter of any one of Examples 14-24 may optionally include the first carrier aggregation setting comprising a secondary cell being configured for the communication terminal for a time interval and the secondary carrier aggregation setting comprising the secondary cell not being configured for the communication terminal for the time interval.

In Example 26, the subject matter of any one of Examples 14-25 may optionally include the first carrier aggregation setting comprising a secondary cell being active for the communication terminal for a time interval and the secondary carrier aggregation setting comprising the secondary cell not being active for the communication terminal for the time interval.

Example 27 is a computer readable medium having recorded instructions thereon which, when executed by a processor, make the processor perform a method for performing radio communication method according to any one of Examples 14 to 26.

Example 28 is a communication terminal comprising a transceiving means for communicating using carrier aggregation according to a first carrier aggregation setting; a detecting means for detecting a need for the communication terminal to reduce its power consumption; and a controlling means for initiating a switch from the first carrier aggregation setting to a second carrier aggregation setting with reduced power consumption compared to the first carrier aggregation setting if the detecting means has detected a need for the communication terminal to reduce its power consumption.

In Example 29, the subject matter of Example 28 may optionally include the detecting means being for detecting a need for the communication terminal to reduce its power consumption based on a current power consumption of the communication terminal.

In Example 30, the subject matter of any one of Examples 28-29 may optionally include the detecting means being for detecting a need for the communication terminal to reduce its power consumption based on a charging level of a battery of the communication terminal.

In Example 31, the subject matter of Example 30 may optionally include the detecting means being for detecting a need for the communication terminal to reduce its power consumption based on whether the charging level being below a threshold.

In Example 32, the subject matter of Example 31 may optionally include a determining means for determining the threshold based on a current power consumption of the communication terminal.

In Example 33, the subject matter of any one of Examples 28-32 may optionally include an estimating means for estimating an amount by which the power consumption of the communication terminal being reduced when switching from the first carrier aggregation setting to the second aggregation setting.

In Example 34, the subject matter of Example 33 may optionally include the estimating means being for estimating the amount based on one or both of a duration for which one or more secondary cells are configured and a duration for which one or more secondary cells are active according to the first carrier aggregation setting.

In Example 35, the subject matter of any one of Examples 33-34 may optionally include the controlling means being for initiating the switch if the detecting means has detected a need for the communication terminal to reduce its power consumption and if the estimated amount is above a predetermined threshold.

In Example 36, the subject matter of any one of Examples 28-35 may optionally include the controlling means being for initiating the switch by sending an indicator to a network component.

In Example 37, the subject matter of Example 36 may optionally include the indicator being a Power Preference Indicator-trigger signaling a desire for a switch from the first carrier aggregation setting to the second carrier aggregation setting based on bilateral or multilateral agreements.

In Example 38, the subject matter of any one of Examples 28-37 may optionally include the controlling means being for initiating the switch by indicating a lower communication performance with a secondary cell than the communication terminal experiences with the secondary cell.

In Example 39, the subject matter of any one of Examples 28-38 may optionally include the first carrier aggregation setting comprising a secondary cell being configured for the communication terminal for a time interval and the secondary carrier aggregation setting comprising the secondary cell not being configured for the communication terminal for the time interval.

In Example 40, the subject matter of any one of Examples 28-39 may optionally include the first carrier aggregation setting comprising a secondary cell being active for the communication terminal for a time interval and the secondary carrier aggregation setting comprising the secondary cell not being active for the communication terminal for the time interval.

It should be noted that one or more of the features of any of the examples above may be combined with any one of the other examples.

In the following, examples are described in more detail.

The following examples are described, as an example, for a scenario as shown in FIG. 1, where a UE 105 may use carrier aggregation i.e. may communicate using a carrier provided by a first (primary) cell 104 and a carrier provided by a second (secondary) cell 104.

As illustrated in FIGS. 2 and 3, the usage of carrier aggregation typically increases the power consumption of the UE 105.

Figure 6:
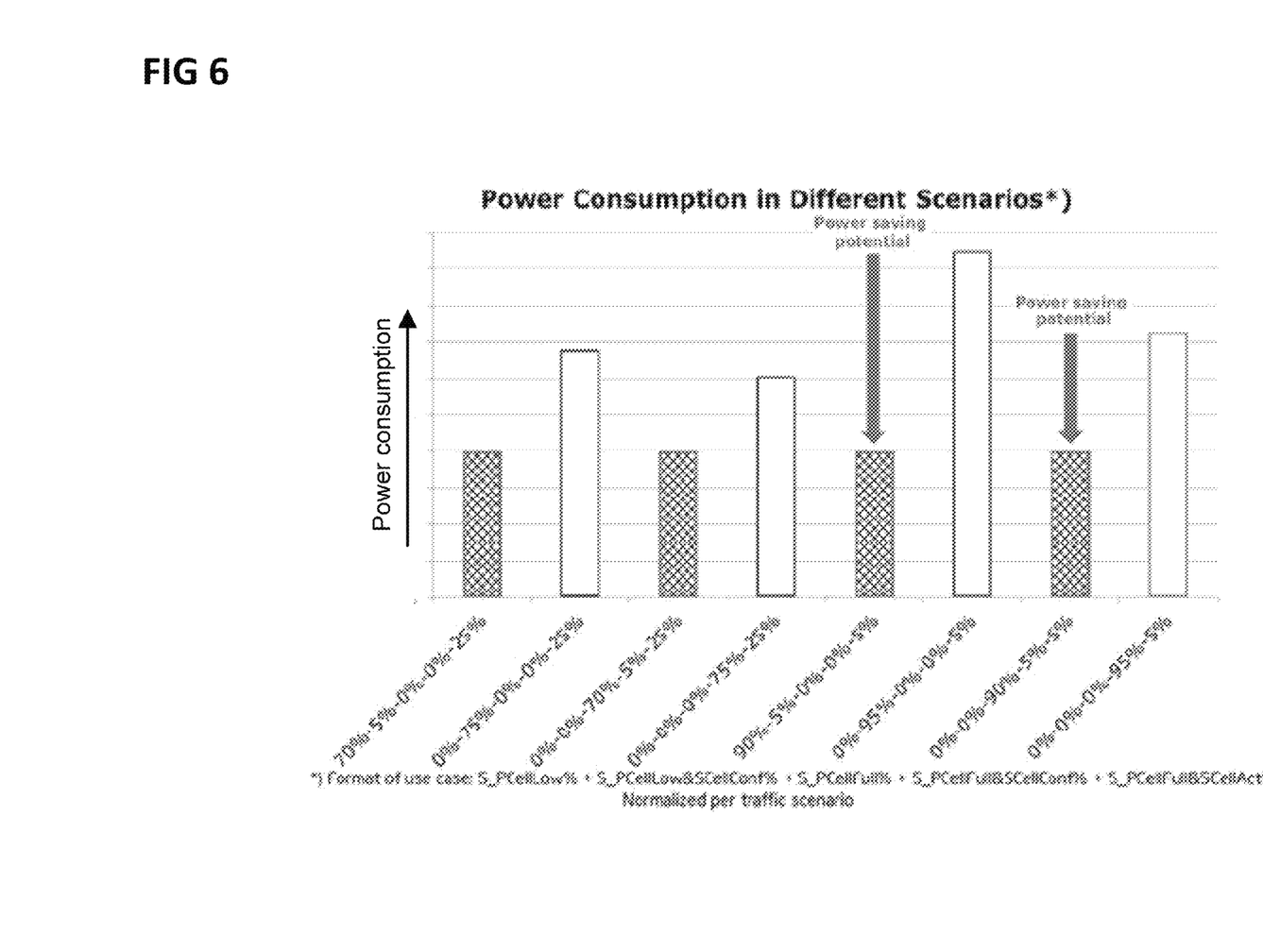
FIG. 6 sketches the traffic-dependent power saving potential due to smart operation of carrier aggregation.

FIG. 6 sketches the traffic-dependent power saving potential due to smart operation of 3 DL carrier aggregation (one primary cell, two secondary cells).

The power consumption increases from bottom to top along the y axis 601 and is shown for various scenarios wherein the power consumption for the different scenarios is normalized per traffic scenario (as indicated by the cross hatched columns). This means that for every pair of adjacent columns in FIG. 3, the left (cross hatched) one is normalized to 100% and the right hand one is scaled accordingly.

Each scenario is given in the format S_PCellLow%+S_PCellLow&SCellConf%+S_PCellFull%+S_PCellFull&SCellConf%+S_PCellFull&SCellAct% which means that in S_PCellLow% of the TTIs (time transmission intervals) only the primary cell is used at a rather low data rate, S_PCellLow&SCellConf% of the TTIs the secondary cells are configured and the primary cell is used at rather low data rate, S_PCellFull% of the TTIs only the primary cell is at a rather high data rate, S_PCellFull&SCellConf% of the TTIs the secondary cells are configured and the primary cell is used at a high data rate and S_PCellFull&SCellAct% of the TTIs both the primary and the secondary cells are in use at a rather high data rate.

For example, in scenario 90%-5%-0%-0%-5%, in 90% of the TTIs the primary cell only is use at a rather low data rate, in 5% of the TTIs the secondary cells are configured being energized every 160 ms for 40 ms for measurements and in 5% of the TTIs the secondary cells are active. In contrast, in scenario 0%-95%-0%-0%-5%, in 95% of the TTIs the secondary cells are configured (still being energized only every 160 ms for 40 ms for measurements). It can be seen that the scenario 90%-5%-0%-0%-5% is more energy-efficient and differs from the scenario 0%-95%-0%-0%-5% significantly for 3 DL CA in power consumption. Similarly, considerable additional power saving potential can be found for 2 DL CA.

The gains are sketched per traffic scenario (cross hatched columns). It can be seen that there is an additional significant power saving potential due to avoiding that the two secondary cells stay configured in 3 DL inter-band CA.

To save power, the UE 105 may, e.g. when it detects a need to reduce its power consumption, initiate a change of carrier aggregation setting (or in other words the carrier aggregation scenario) according to one or a combination of the following approaches a) to c). It is for example assumed that the UE has a power-optimized implementation for all 3GPP-based carrier aggregation states including configuration, activation, and scheduled states.

a) Network-Transparent Solution

The UE tracks the effect of LTE carrier aggregation on power consumption to autonomously steer towards avoiding or shutting down CA. This may for example include a UE standalone exploitation of existing signaling schemes to cause the network to de-activate or even de-configure a secondary carrier. The UE may for example "cheat" on some signaling (e.g. report false results) in order to make the network (e.g. the respective eNB 104) to avoid CA.

Such a technique may not only be applied for reasons of power savings but as well to establish CA situations that are compliant to potentially required Dual-SIM-Dual-Standby or Dual-SIM-Dual-Active configurations.

For example, e.g. deciding based on a metric as described below, the UE steers the network towards avoiding and or shutting down carrier aggregation using one or a combination of the following techniques:

Shutdown of a configured secondary cell as well as avoidance of the activation of a secondary cell:
 (1) the UE does not provide measurements on the configured secondary cell and/or
 (2) the UE reports out-of-sync/out-of-range (OOR) on the configured secondary cell.
 This can be expected to cause the network to not activate and to eventually de-configure the secondary cell.

Shutdown of an activated secondary cell:
 (3) the UE sets CQI reporting to OOR in order to avoid scheduling on the activated secondary cell.
 This can be expected to cause the network to avoid scheduling and to eventually de-activate the secondary cell.
 (4) In case of scheduled traffic on the secondary cell, the UE permanently transmits NACKs (negative acknowledgements) on the transport blocks of the secondary cell. This can be expected to cause the network to stall data on the secondary cell, and to eventually de-activate and then de-configure the secondary cell.

Avoid configuration and activation of a secondary cell:
 A UE providing permanent OORs as well as NACKs (also on the primary cell) may enter data stalls resulting in RRC connection release.

Further methods for steering the network towards power savings may involve:
 (5) Not to signal relevant carrier aggregation capabilities following RRC Connection Reestablishment.

b) Network-Involved Solution Based on Generically Used 3GPP Rel-11 Standard PPI-Trigger The 3GPP standard provides a signaling parameter (Rel-11 EDDA/PPI) which is optional and whose usage details have been left open both to the UE as well as to the network infrastructure. The UE may for example signal the need for power savings with the LTE Rel11 Power Preference Indicator (PPI) and the network may then take generic measures to reduce the UE power consumption. The UE can anticipate those generic measures and fine-tune its criteria when to trigger power savings by setting the 3GPP Rel-11 standard PPI bit. This approach can be realized by semi-formal bilateral or multi-lateral agreements between UE vendors and infrastructure vendors. For example, generic network-involved solutions could be made available to all UE vendors and all infrastructure vendors by extending the 3GPP standard to some kind of 3GPP Rel12 PPI. In response to the reception of the PPI from a UE the network configures the carrier aggregation for the UE to be more power efficient at the expense of throughput and/or latency.

For example, the generic measures taken by the network may include
De-activation of a secondary cell
(6) Avoiding activation of a configured secondary cell and de-configuring of a secondary cell
(7) Avoiding CA capability transmission upon RRC Connection Re-establishment
(8) Increasing the measCycleSCell value (potentially to the maximum value)
others.

c) Network-Involved Solution Based on UE-Specific Rel-11 PPI-Tripper

Similarly to approach b), the UE may for example signal the need for power savings with the LTE Rel11 Power 2 DL CA (embodiment of this ID) for the considered UE depending on the bilaterally agreed preferences of UE vendor and based on observed traffic-scenarios and power consumption status.

Smart operation of UL carrier aggregation: As UL CA is quite costly in terms of power consumption the network vendor (based on knowing the UE trigger point) can for example:
(11) Activate UL CA only in combination with a bursty UL traffic scheduler mode.
(12) Activate UL CA only when specific strict QoS requirements (e.g. delay sensitive) are to be met.

A summary of approaches a) to c) is given in table 1.

TABLE 1

| Power savings for carrier aggregation operation | | |
| --- | --- | --- |
| Network-transparent approach | Network-involved approach based on generic Rel11 PPI-trigger | Network-involved approach based on UE-specific PPI-trigger |
| UE autonomously steers network to de-activate and de-configure secondary cells | Set of measures the network may apply as a whole or partially if any UE sets Power Preference Indicator (PPI) to "lowPowerConsumption" | Set of measures the network may apply as a whole or partially if a specific UE sets Power Preference Indicator (PPI) to "lowPowerConsumption" |

Preference Indicator (PPI). In contrast to b), the network may then take UE-specific measures to reduce the UE power consumption. For example, UE-specific PPI-triggered power savings may involve:
(i) Smart operation of higher order DL carrier aggregation e.g.:
(ia) Traffic-dependent avoidance of persistently configured secondary cells
(ib) Trade-off between short periods of higher order DL CA and longer periods of 2 DL CA
(ii) Smart operation of UL carrier aggregation e.g.:
(iia) UL CA only in combination with a bursty UL traffic scheduler mode.

For example, formal agreements between the UE vendor and infrastructure vendor(s) enable the network (e.g. the respective eNB) to provide optimal power saving measures specific to a UE or chipset vendor e.g. based on the UE's IMSI or some other detection mechanism e.g. via the UE capability profile which is indicative of a capability of the UE and thus the used components.

For example, based on bilateral agreements between network vendors and UE vendor (and based on the UE IMEI/TAC (International Mobile Equipment Identity) or the UE TAC (Type Allocation Code)), the network can react in a UE-specific manner to the PPI. In contrast to actions taken in the generic case of approach b), actions taken in the UE-specific case can be more sophisticated or tailored. This can for example involve:
  Smart operation of higher order DL carrier aggregation:
    Instead of just de-activating or de-configuring all secondary cells in higher order DL carrier aggregation, the network vendor (based on knowing the UE trigger point) can for example:
      (9) Avoid persistently configured DL secondary cells for the considered UE only if necessary based on observed traffic-scenarios and power consumption status.
      (10) Configure the DL scheduler to trade between short periods of higher order DL CA and longer periods of The UE may autonomously steer or signal a request for a CA resetting (i.e. a change of the CA setting, e.g. a change of the CA scenario) to the network based on a self-consistent metric, i.e. based on a statistic and/or states tracking the effect of carrier aggregation (CA) operation on power consumption.

For example, the UE uses a metric representative of the power savings to be expected of a CA resetting. The UE may then use the metric as a trigger for the initiation of a CA resetting. For example, if the metric indicates a saving potential that is high enough (e.g. above a threshold), then the UE initiates a CA resetting, e.g. asks the network for a more power-friendly configuration (i.e. carrier aggregation setting). A similar metric can be used on the network side, e.g. in approach c). For example, the network may apply a certain resetting if the power saving it expects is above a certain threshold, for example if the UE has set signaled the PPI. This may make certain signaling (e.g. of the specific power saving measure that the UE wants to be carried out) redundant.

For example, the metric based on which the UE decides whether it steers or signals to the network that DL CA operation shall be switched off or optimized is a self-consistent metric in the sense that no other CA setting (i.e. CA scenario) than the one currently used and the traffic observed in this scenario are used by the UE to judge the power saving potential.

For example, for DL CA power savings, the UE may keep track of the following DL CA operation metrics and combine those with its battery status in order to decide whether to initiate a CA resetting. For example, the following UE power consumption states are considered as the minimum set for DL CA-based operation:
  primary cell only at Low Load (PCellLow) (An average of VoLTE and low RB DL allocation)
  primary cell only at Full Load (PCellFull, i.e. primary cell full or close to full RB DL allocations)
  primary cell at Low Load+#n*secondary cell(s) configured (SCellConf)

primary cell at Full Load+#n*secondary cell(s) configured primary cell at Full Load+#n (or at least 1) secondary cell(s) active at full Load (SCellAct)

For example, the higher the ratio of TTIs with secondary cell configured vs. secondary cell active, the higher the power saving potential from de-configuring non-active secondary cells. The power saving potential is low if the ratio of TTIs with secondary cell Non-Active (i.e. primary cell only or primary cell+SCell Configured) over secondary cell active is low.

Using those ratios the UE can aggregate a self-consistent CA operation metric (i.e. a metric without using other information than the one observable by the UE in the current configuration) to judge on the potential of power savings and to either steer or signal to the network for power savings.

There are numerous ways of defining a self-consistent metric with the same or similar aggregated decision criterion. One example of exploiting the ratios mentioned above is illustrated in FIG. 7.

Figure 7:
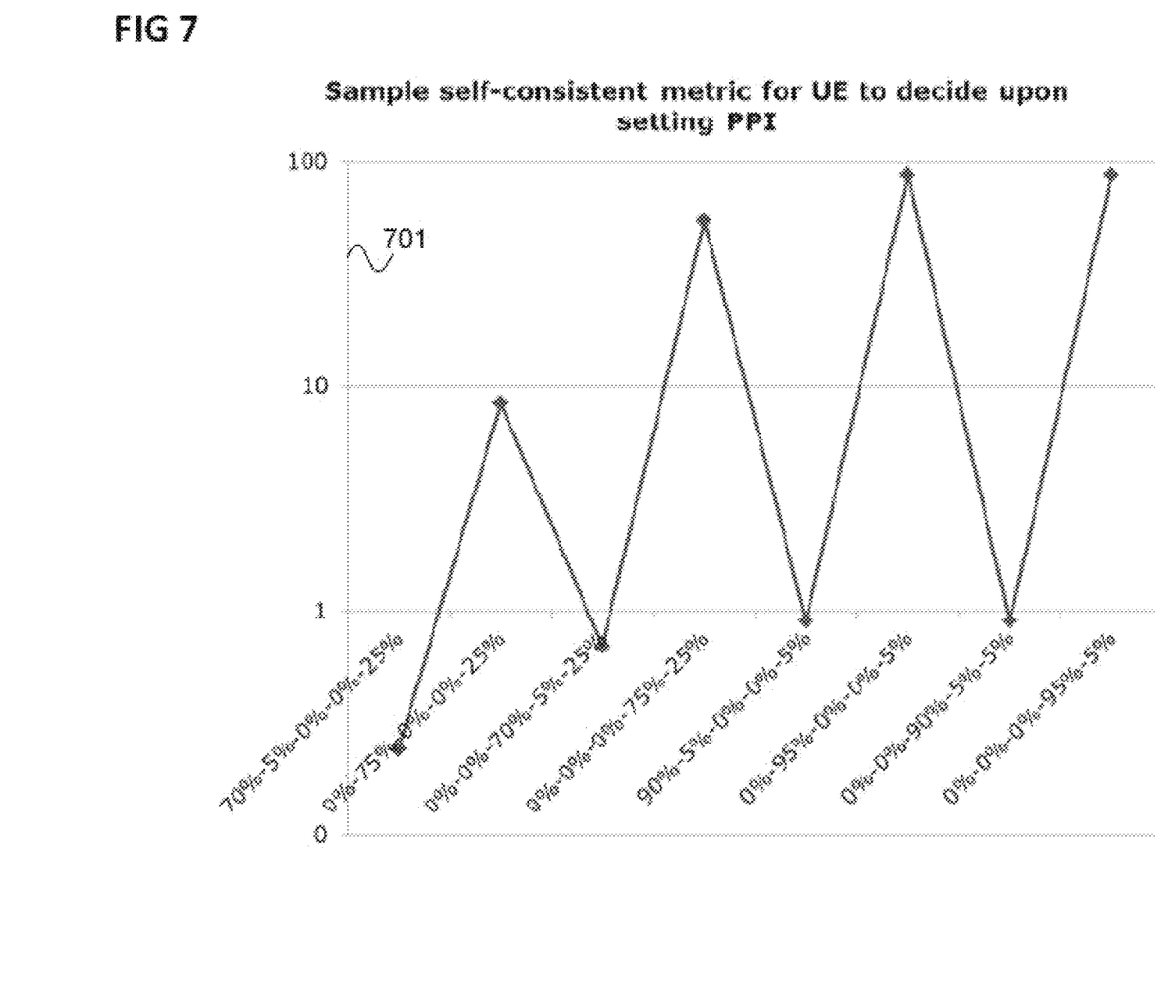
FIG. 7 illustrates a sample self-consistent metric which may be used by a communication terminal to decide whether to initiate a change of the carrier aggregation setting.

FIG. 7 illustrates a sample self-consistent metric used by the UE to decide whether to set the PPI.

The value of the metric is given according to an y-axis 701. The metric's values for various scenarios, indicated in the percentage format described above, are given.

The metric is in this example given by $$\text{Metric} = \begin{cases} PCellLow \| PCellLowSCellConf > 0\%: |1 - (PCellLowSCellConf - \in)/(PCellLow + \in)| \cdot (1 - PCellFullSCellAct) \\ PCellFull \| PCellFullSCellConf > 0\%: |1 - (PCellFullSCellConf - \in)/(PCellFull + \in)| \cdot (1 - PCellFullSCellAct) \end{cases}$$

wherein $\|$ indicates "or" and E is a small value (e.g. 0.1 (i.e. 10%), 0.01 (i.e. 1%) or 0.001 (i.e. 0.1%)).

For example, whenever the metric exceeds the value 1, the UE sets the PPI and the network changes the DL carrier aggregation setting by de-configuring the secondary cell(s) whenever possible.

The approaches described above may for example be implemented in a LTE communication terminal without modifying the 3GPP standard to enable UE/chipset vendor differentiation or infrastructure vendor differentiation or both with respect to power saving capabilities.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A communication terminal comprising
a transceiver configured to communicate using carrier aggregation based on a first carrier aggregation setting;
a detector configured to determine that the communication terminal needs to reduce its power consumption; and
a controller configured to switch from the first carrier aggregation setting to a second carrier aggregation setting with reduced power consumption compared to the first carrier aggregation setting based on the determined need to reduce power consumption by the communication terminal,
wherein the first carrier aggregation setting includes a first secondary cell configured for the communication terminal for a first predefined percentage of a set of transmission time intervals, and
the secondary carrier aggregation setting includes a second secondary cell configured for the communication terminal for a second predefined percentage of the set of transmission time intervals.

2. The communication terminal according to claim 1, wherein the detector is configured to detect a need for the communication terminal to reduce its power consumption based on a current power consumption of the communication terminal.

3. The communication terminal according to claim 1, wherein the detector is configured to detect a need for the communication terminal to reduce its power consumption based on a charging level of a battery of the communication terminal.

4. The communication terminal according to claim 3, wherein the detector is configured to detect a need for the communication terminal to reduce its power consumption based on whether the charging level is below a threshold.

5. The communication terminal according to claim 4, comprising
a determiner configured to determine the threshold based on a current power consumption of the communication terminal.

6. The communication terminal according to claim 1, further comprising
an estimator configured to estimate an amount by which the power consumption of the communication terminal is reduced when switching from the first carrier aggregation setting to the second carrier aggregation setting.

7. The communication terminal according to claim 6, wherein the estimator is configured to estimate the amount based on one or both of a duration for which one or more secondary cells are configured and a duration for which one or more secondary cells are active according to the first carrier aggregation setting.

8. The communication terminal according to claim 6, wherein the controller is configured to initiate the switch if the detector has determined that the communication terminal needs to reduce its power consumption and if the estimated amount is above a predetermined threshold.

9. The communication terminal according to claim 1, wherein the controller is configured to initiate the switch by sending an indicator to a network component, and the indicator includes a $3^{rd}$ Generation Partnership Project (3GPP) Power Preference Indicator (PPI) bit being set.

10. The communication terminal according to claim 1, wherein the controller is configured to initiate the switch by indicating a lower communication performance with a secondary cell than the communication terminal experiences with the secondary cell.

11. The communication terminal according to claim 1, wherein the second predefined percentage of the set of transmission time intervals is a non-zero percentage.

12. The communication terminal according to claim 1, wherein the controller is configured to initiate the switch by withholding measurements on the first secondary cell, reporting out-of-sync messages on the first secondary cell, and/or reporting out-of-range messages on the first secondary cell.

13. The communication terminal according to claim 1, wherein the first secondary cell and the second secondary cell are the same cell.

14. The communication terminal according to claim 1, wherein the first predefined percentage of the set of transmission time intervals is greater than the second predefined percentage of the set of transmission time intervals.

15. A method for controlling power consumption of a communication terminal comprising
communicating, by a communication terminal, with a primary cell;
communicating, by the communication terminal, using carrier aggregation according to a first carrier aggregation setting;
detecting a need for the communication terminal to reduce its power consumption; and
initiating a switch from the first carrier aggregation setting to a second carrier aggregation setting with reduced power consumption compared to the first carrier aggregation setting if the communication terminal has a need to reduce its power consumption,
wherein the first carrier aggregation setting includes a secondary cell being configured for the communication terminal for a first predefined percentage of a set of transmission time intervals,
the secondary cell is different from the primary cell,
the secondary carrier aggregation setting comprises the secondary cell being configured for the communication terminal for a second predefined percentage of the set of transmission time intervals, and
the first predefined percentage of the set of transmission time intervals being greater than the second predefined percentage of the set of transmission time intervals.

16. The method according to claim 15, comprising detecting the need of the communication terminal to reduce its power consumption based on a current power consumption of the communication terminal.

17. The method according to claim 15, comprising detecting the need of the communication terminal to reduce its power consumption based on a charging level of a battery of the communication terminal.

18. The method according to claim 17, comprising detecting the need of the communication terminal to reduce its power consumption based on whether the charging level is below a threshold.

19. The method according to claim 18, comprising determining the threshold based on a current power consumption of the communication terminal.

20. The method according to claim 15, further comprising estimating an amount by which the power consumption of the communication terminal is reduced when switching from the first carrier aggregation setting to the second carrier aggregation setting.

21. A communication terminal comprising
a transceiver that communicates using carrier aggregation according to a first carrier aggregation setting;
a detector that detects a need for the communication terminal to reduce its power consumption; and
a controller that initiates a switch from the first carrier aggregation setting to a second carrier aggregation setting with reduced power consumption compared to the first carrier aggregation setting if the detector has detected a need for the communication terminal to reduce its power consumption,
wherein the first carrier aggregation setting comprises a secondary cell being active for the communication terminal for a first predefined percentage of a set of transmission time intervals,
the secondary carrier aggregation setting comprises the secondary cell being active for the communication terminal for a second predefined percentage of the set of transmission time intervals, and
the first predefined percentage of the set of transmission time intervals being greater than the second percentage of the set of transmission time intervals.

22. The communication terminal according to claim 21, wherein the second predefined percentage of the set of transmission time intervals is a non-zero percentage.

* * * * *